US011974526B2

(12) United States Patent
McClain

(10) Patent No.: US 11,974,526 B2
(45) Date of Patent: *May 7, 2024

(54) IRRIGATION WATER RECIRCULATION SYSTEM

(71) Applicant: Southside Landscaping Co., Blue Island, IL (US)

(72) Inventor: Kevin McClain, Blue Island, IL (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/355,276

(22) Filed: Jun. 23, 2021

(65) Prior Publication Data

US 2021/0315172 A1 Oct. 14, 2021

Related U.S. Application Data

(63) Continuation of application No. 16/177,936, filed on Nov. 1, 2018, now Pat. No. 11,071,259.

(60) Provisional application No. 62/580,623, filed on Nov. 2, 2017.

(51) Int. Cl.

| A01G 25/00 | (2006.01) |
| A01G 25/16 | (2006.01) |
| B01D 29/05 | (2006.01) |
| B01D 39/16 | (2006.01) |
| B05B 15/40 | (2018.01) |
| C02F 1/00 | (2023.01) |
| C02F 1/44 | (2023.01) |
| C02F 103/00 | (2006.01) |
| E03B 3/06 | (2006.01) |
| E03F 1/00 | (2006.01) |

(52) U.S. Cl.
CPC ............. *A01G 25/00* (2013.01); *A01G 25/16* (2013.01); *B01D 29/05* (2013.01); *B01D 39/16* (2013.01); *B01D 39/1623* (2013.01); *B05B 15/40* (2018.02); *C02F 1/004* (2013.01); *C02F 1/44* (2013.01); *E03B 3/06* (2013.01); *E03F 1/00* (2013.01); *E03F 1/002* (2013.01); *C02F 1/444* (2013.01); *C02F 2103/001* (2013.01)

(58) Field of Classification Search
None
See application file for complete search history.

(56) References Cited

U.S. PATENT DOCUMENTS

| 1,508,480 | A | * | 9/1924 | Skinner | B01D 35/02 |
| | | | | | 210/451 |
| 2,125,532 | A | * | 8/1938 | Wells | B01D 29/118 |
| | | | | | 210/414 |
| 3,797,667 | A | * | 3/1974 | Rod | B01D 21/0012 |
| | | | | | 210/313 |
| 4,017,395 | A | * | 4/1977 | Davis | B01D 37/00 |
| | | | | | 210/197 |

(Continued)

*Primary Examiner* — Robert J Popovics
(74) *Attorney, Agent, or Firm* — Josef L. Hoffmann; The Small Patent Law Group LLC

(57) ABSTRACT

An irrigation recirculation system and methods of filtering and cleaning water within the irrigation recirculation system. The system includes an above the ground water source and a fluid flow conduit that conveys the water into a filter element within a basin. The filter element separates solids from the water by causing the water to change direction before continuing on a fluid flow path. The water is then stored and distributed by a self-cleaning storage system that convey the filtered water to sprinkler heads of the irrigation system.

5 Claims, 7 Drawing Sheets

(56) References Cited

U.S. PATENT DOCUMENTS

| | | | | |
|---|---|---|---|---|
| 4,051,042 A * | 9/1977 | Tullier | B01D 35/02 | 4/256.1 |
| 4,162,218 A * | 7/1979 | McCormick | C02F 1/006 | 210/167.01 |
| 4,228,006 A * | 10/1980 | Hanna | E03B 1/04 | 210/167.3 |
| 4,359,789 A * | 11/1982 | Roberts | E03B 1/041 | 4/300 |
| 4,609,459 A * | 9/1986 | Hendrix | B01D 35/02 | 210/91 |
| 4,689,145 A * | 8/1987 | Mathews | B01D 29/56 | 210/260 |
| 4,934,404 A * | 6/1990 | DeStefano | E03B 3/03 | 137/565.33 |
| 5,192,426 A * | 3/1993 | DeCoster | E03B 1/04 | 210/170.07 |
| 5,595,656 A * | 1/1997 | Yun | B01D 29/6438 | 210/90 |
| 5,620,594 A * | 4/1997 | Smith | B01D 21/2466 | 210/523 |
| 5,863,443 A * | 1/1999 | Mainwaring | B01D 21/0006 | 210/441 |
| 6,132,138 A * | 10/2000 | Haese | C05F 7/00 | 210/170.07 |
| 6,350,374 B1 * | 2/2002 | Stever | B01D 21/0006 | 210/170.03 |
| 6,663,769 B2 * | 12/2003 | Hosoya | C02F 1/725 | 210/138 |
| 6,719,900 B2 * | 4/2004 | Hawkins | B01D 29/902 | 210/295 |
| 6,887,375 B2 * | 5/2005 | Johnson | E03B 1/04 | 210/170.03 |
| 6,904,926 B2 * | 6/2005 | Aylward | E03B 1/044 | 137/597 |
| 6,905,607 B2 * | 6/2005 | Hosoya | C02F 1/725 | 210/764 |
| 6,958,118 B2 * | 10/2005 | Hill | B01D 37/04 | 210/138 |
| 7,001,527 B2 * | 2/2006 | Stever | B01D 17/0214 | 210/801 |
| 7,121,292 B2 * | 10/2006 | Aylward | E03B 1/04 | 137/119.01 |
| 7,182,874 B2 * | 2/2007 | Allard | E03F 5/14 | 210/801 |
| 7,311,115 B1 * | 12/2007 | Wendell | E03B 1/04 | 137/236.1 |
| 7,344,640 B2 * | 3/2008 | Gannon | B01D 36/02 | 210/170.03 |
| 8,191,307 B2 * | 6/2012 | Donoghue | A01G 25/16 | 47/79 |
| 8,377,291 B2 * | 2/2013 | Eckman | E03B 1/042 | 210/411 |
| 8,663,466 B2 * | 3/2014 | Braunwarth | E03F 5/14 | 210/170.03 |
| 8,696,897 B2 * | 4/2014 | Marugame | C02F 1/283 | 210/206 |
| 8,715,507 B2 * | 5/2014 | Gulliver | B01D 21/28 | 210/801 |
| 8,746,463 B2 * | 6/2014 | Cobb | B01D 21/2411 | 210/170.03 |
| 8,813,779 B2 * | 8/2014 | Criss | A01G 25/16 | 137/395 |
| 8,857,730 B2 * | 10/2014 | Hartfelder | A01G 25/16 | 239/69 |
| 8,893,814 B2 * | 11/2014 | Bui | A62C 99/0072 | 239/DIG. 15 |
| 8,950,428 B2 * | 2/2015 | Sly | E03B 1/041 | 137/357 |
| 9,327,219 B2 * | 5/2016 | Brunswick | B01D 29/114 | |
| 9,345,994 B2 * | 5/2016 | Morris | B01D 35/02 | |
| 9,375,659 B2 * | 6/2016 | Bird | B01D 36/04 | |
| 9,506,237 B2 * | 11/2016 | Braunwarth | B01D 21/0033 | |
| 9,631,641 B2 * | 4/2017 | Choi | F04D 29/708 | |
| 9,644,350 B2 * | 5/2017 | Khalifeh | B01D 36/005 | |
| 9,752,600 B2 * | 9/2017 | Hoff | E03F 1/00 | |
| 9,832,939 B2 * | 12/2017 | Russell | E03B 1/04 | |
| 10,182,524 B2 * | 1/2019 | Hannaford | A01G 25/00 | |
| 10,208,462 B2 * | 2/2019 | Carter | E03B 3/02 | |
| 10,225,996 B1 * | 3/2019 | Kremicki | B05B 12/081 | |
| 10,285,345 B2 * | 5/2019 | Gong | B08B 9/0856 | |
| 10,315,136 B2 * | 6/2019 | Eckman | B01D 29/68 | |
| 10,344,466 B2 * | 7/2019 | Kent | B01D 21/0003 | |
| 10,408,242 B1 * | 9/2019 | Chamberlain | F15D 1/025 | |
| 10,655,318 B2 * | 5/2020 | Päivinen | E03F 5/106 | |
| 10,667,475 B2 * | 6/2020 | Ivory | A01G 25/023 | |
| 10,704,234 B2 * | 7/2020 | Baer | E03D 5/003 | |
| 10,704,246 B2 * | 7/2020 | Roseen | E01C 11/227 | |
| 10,730,765 B2 * | 8/2020 | Smith | C02F 1/32 | |
| 10,798,886 B2 * | 10/2020 | Russell | E03B 1/04 | |
| 10,941,557 B1 * | 3/2021 | Graf | B01D 21/0087 | |
| 11,002,000 B2 * | 5/2021 | Ellis | B01D 21/0042 | |
| 11,071,259 B2 * | 7/2021 | McClain | E03B 3/06 | |
| 11,141,617 B2 * | 10/2021 | McClain | A01G 25/16 | |
| 11,247,087 B2 * | 2/2022 | McDonald | G08B 17/005 | |
| 11,247,924 B2 * | 2/2022 | Truong | C02F 3/109 | |
| 11,261,595 B2 * | 3/2022 | Kent | B01D 21/0012 | |
| 11,346,094 B2 * | 5/2022 | Lee | B01D 35/1435 | |
| 11,351,935 B2 * | 6/2022 | Van Beek | B60R 15/00 | |
| 11,408,162 B2 * | 8/2022 | Cashatt | E03F 1/002 | |
| 11,459,744 B2 * | 10/2022 | Swope | C02F 1/001 | |
| 11,505,936 B1 * | 11/2022 | Graf | E03F 5/14 | |
| 11,529,574 B2 * | 12/2022 | Stednitz | B01D 29/35 | |
| 2001/0030161 A1 * | 10/2001 | Hosoya | C02F 1/725 | 210/764 |
| 2003/0019150 A1 * | 1/2003 | St.Onge | C02F 1/78 | 47/1.01 R |
| 2003/0183587 A1 * | 10/2003 | Hawkins | B01D 29/945 | 210/313 |
| 2004/0144704 A1 * | 7/2004 | Johnson | E03B 1/04 | 210/170.03 |
| 2005/0184007 A1 * | 8/2005 | Allard | E03F 5/14 | 210/512.2 |
| 2007/0023355 A1 * | 2/2007 | Park | B01D 21/267 | 210/513 |
| 2010/0108595 A1 * | 5/2010 | Heelan, Jr. | B01D 35/02 | 210/433.1 |
| 2010/0300544 A1 * | 12/2010 | Baldwin | E03B 3/03 | 137/1 |
| 2011/0005602 A1 * | 1/2011 | Harrington | E03B 1/04 | 137/357 |
| 2011/0088315 A1 * | 4/2011 | Donoghue | A01G 25/16 | 137/511 |
| 2011/0174706 A1 * | 7/2011 | Russell | A01G 25/00 | 405/36 |
| 2012/0090707 A1 * | 4/2012 | Marugame | C02F 1/283 | 137/565.01 |
| 2012/0199220 A1 * | 8/2012 | Knepp | E03B 1/041 | 137/558 |
| 2012/0216881 A1 * | 8/2012 | Donoghue | A01G 25/16 | 137/386 |
| 2012/0228117 A1 * | 9/2012 | Panunzio | C02F 9/00 | 203/10 |
| 2012/0255622 A1 * | 10/2012 | Braunwarth | E03F 5/14 | 137/15.01 |
| 2012/0305492 A1 * | 12/2012 | Byrne, Jr. | E03B 1/042 | 210/170.03 |
| 2012/0325923 A1 * | 12/2012 | Hartfelder | A01G 25/16 | 239/74 |
| 2013/0200171 A1 * | 8/2013 | Hartfelder | A01G 25/16 | 239/74 |
| 2014/0124042 A1 * | 5/2014 | Braunwarth | B01D 21/0033 | 137/15.01 |
| 2014/0129031 A1 * | 5/2014 | Carter | E04D 13/00 | 700/275 |
| 2014/0144850 A1 * | 5/2014 | Chai | E03F 1/002 | 210/170.03 |
| 2014/0346099 A1 * | 11/2014 | Brantley | E03B 3/02 | 210/127 |

(56) References Cited

U.S. PATENT DOCUMENTS

| | | | |
|---|---|---|---|
| 2015/0204055 A1* | 7/2015 | Khalifeh | C02F 1/008 |
| | | | 210/137 |
| 2019/0078310 A1* | 3/2019 | Kent | B01D 21/245 |
| 2019/0078311 A1* | 3/2019 | Päivinen | B01D 21/0003 |
| 2019/0124857 A1* | 5/2019 | McClain | E03F 1/002 |
| 2019/0264717 A1* | 8/2019 | Chamberlain | E03F 5/021 |
| 2019/0330836 A1* | 10/2019 | Kent | B01D 21/0042 |
| 2019/0351272 A1* | 11/2019 | McClain | A62C 37/44 |
| 2020/0040562 A1* | 2/2020 | Cashatt | E03F 5/10 |
| 2020/0197844 A1* | 6/2020 | Stednitz | B01D 35/02 |
| 2021/0032137 A1* | 2/2021 | Truong | C02F 3/102 |
| 2021/0315172 A1* | 10/2021 | McClain | E03F 1/00 |
| 2021/0381215 A9* | 12/2021 | Cashatt | E03F 5/10 |
| 2022/0186486 A1* | 6/2022 | Kent | B01D 21/0006 |

\* cited by examiner

IRRIGATION WATER RECIRCULATION SYSTEM

CROSS-REFERENCE TO RELATED APPLICATIONS

This application is a continuation of U.S. patent application Ser. No. 16/177,936, entitled Irrigation Water Recirculation System, which was filed 1 Nov. 2018 that claimed priority to U.S. Provisional Application No. 62/580,623, entitled Irrigation Water Recirculation System, which was filed 2 Nov. 2017, and the entire disclosure of each of which is incorporated herein by reference.

TECHNICAL FIELD

This document pertains generally, but not by way of limitation, to an irrigation recirculation system that includes multiple subsystems for recycling and filtering rain and irrigation water for use in an irrigation system. More particularly, but not by way of limitation, this disclosure relates to systems, devices, and methodologies for recycling and filtering the water in an irrigation system.

BACKGROUND

Water irrigation systems can range in size from being in someone's backyard to under an entire football field. A conduit system placed underground terminates in discharge nozzles that are referred to as sprinkler heads. The sprinkler heads dispense the water from the conduits. Sometimes, the sprinkler heads are located above the ground. Other times, such as in applications such as sports fields, the sprinkler head is only extended from under the ground to above the ground during use of the irrigation system. The sprinkler heads are positioned apart from one another and rotate to ensure full coverage of a spray area.

Under the ground, the conduit terminating at the sprinkler head extends to a water source. Groups of sprinkler heads, referred to as zones, will have a single input conduit such that when water flows to a first zone, all of the sprinkler heads in that zone dispense water. A valve or valve system can then be utilized so that the different zones operate independently of one another. A control system may thus be utilized with a timing circuit to operate different zones of sprinkler heads at different times during the day.

The water source for such irrigation systems can be an above the ground storage tank or below the ground storage tank. Water is received within a tank from an external water supply such as a city water tower or city water filtration facility and replenished accordingly. Examples of external water supplies include, but are not limited to any municipal water supply, a village, city, or state water supply, or any other water supply provided by any third party that supplies the water. Such irrigation systems are installed by digging into a yard or field, placing the system into place and then coupling the system to the city water system. These systems are maintained by the installer who cleans the system and performs routine maintenance.

OVERVIEW

In an effort to reduce or minimize the amount of water that needs to be received from an external water supply, water recirculation systems can be utilized. These water recirculation systems attempt to take water from secondary sources to supplement the water supply in storage units so that less water needs to be used from the external water supply. Secondary sources can include, but are not limited to rain water from gutters on a roof, water from other rain gathering devices, underground water saturated in the soil, and standing rainwater or irrigation water in the irrigation area.

In gathering such water, care is taken in cleaning the water. Debris and other solids in an irrigation system can have significant consequences. Such debris can cause clogs and blockage in conduits and the sprinkler heads that can cause damage to the irrigation system. In particular, to discharge blockage, pumps are forced to provide additional pressure, resulting in wear on the pump. The higher than expected pressure also results in uneven distribution of water across an irrigated area. The end result can be unscheduled maintenance and early replacement of irrigation equipment, causing frustrations for irrigation system users.

Additionally, municipalities have regulations regarding water quality, regardless of whether the water is to be used for irrigation or otherwise. Specifically, testing is done for bacteria such as e-coli, and unsafe contaminants such as lead or mercury, to prevent unsafe contaminations that can be harmful to a community. Thus, filtration, cleaning, and disinfecting of water is a useful component of the irrigation recirculation system.

Certain systems for keeping water clean can have multiple disadvantages. For example, filters that simply catch debris can become blocked, reducing effectiveness and increasing maintenance. While cleaning of above the ground storage tanks can be accomplished, above the ground storage tanks are unsightly and prone to water evaporation and freezing without additional protection. Cleaning a below the ground storage tank can be disruptive to irrigation system owners and time consuming for installers and maintainers.

This document describes, among other things, an irrigation recirculation system that can include multiple filtering subsystems for filtering water prior to distribution to the sprinkler heads. This can include an initial filter element located within a basin that intakes recirculated water. The filter element can separates solids, such as dirt and debris, from water such as through turbulence. For example, by striking the filter, a change in direction of the water occurs resulting in the water moving faster than the solids. This can help cause the solid to sink to the bottom of the basin for removal.

Additional filtering subsystems can include a storage tank such as formed from a perforated membrane that can allow the passage of ground water and can inhibit or prevent the passage of debris. Also described is a distribution tank subsystem that can use a low-pressure waste water pump concurrently with a high-pressure pump that stirs the water within a distribution tank such as to facilitate the movement of solids to a waste water reservoir. Another subsystem uses a control system of the irrigation recirculation system to control one or more valve elements and a high-pressure pump such as to push a mixture of high pressure air and water through the sprinkler head such as to dislodge debris without requiring using an air compressor. As a result of one or a combination of these filtering devices or methods, a microfilter is also able to be utilized prior to the sprinkler head discharge. In all, these subsystems can help increase or maximize recirculated water to be utilized by the irrigation system while providing extensive filtration prior to discharge with reduced or minimal maintenance and upkeep costs.

This Overview is intended to provide non-limiting examples of the present subject matter—it is not intended to provide an exclusive or exhaustive explanation. The Detailed Description below is included to provide further information about the present apparatuses and methods.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices, systems, and methods for recycling water, such as rainwater, by a water recirculation system. The Figures are all related to various examples of a water recirculation system, water recirculation subsystems, and methodologies related to filtering and cleaning water within the water recirculation irrigation system. While not shown, other examples using similar systems, devices, and methodologies are contemplated.

Figure 1:
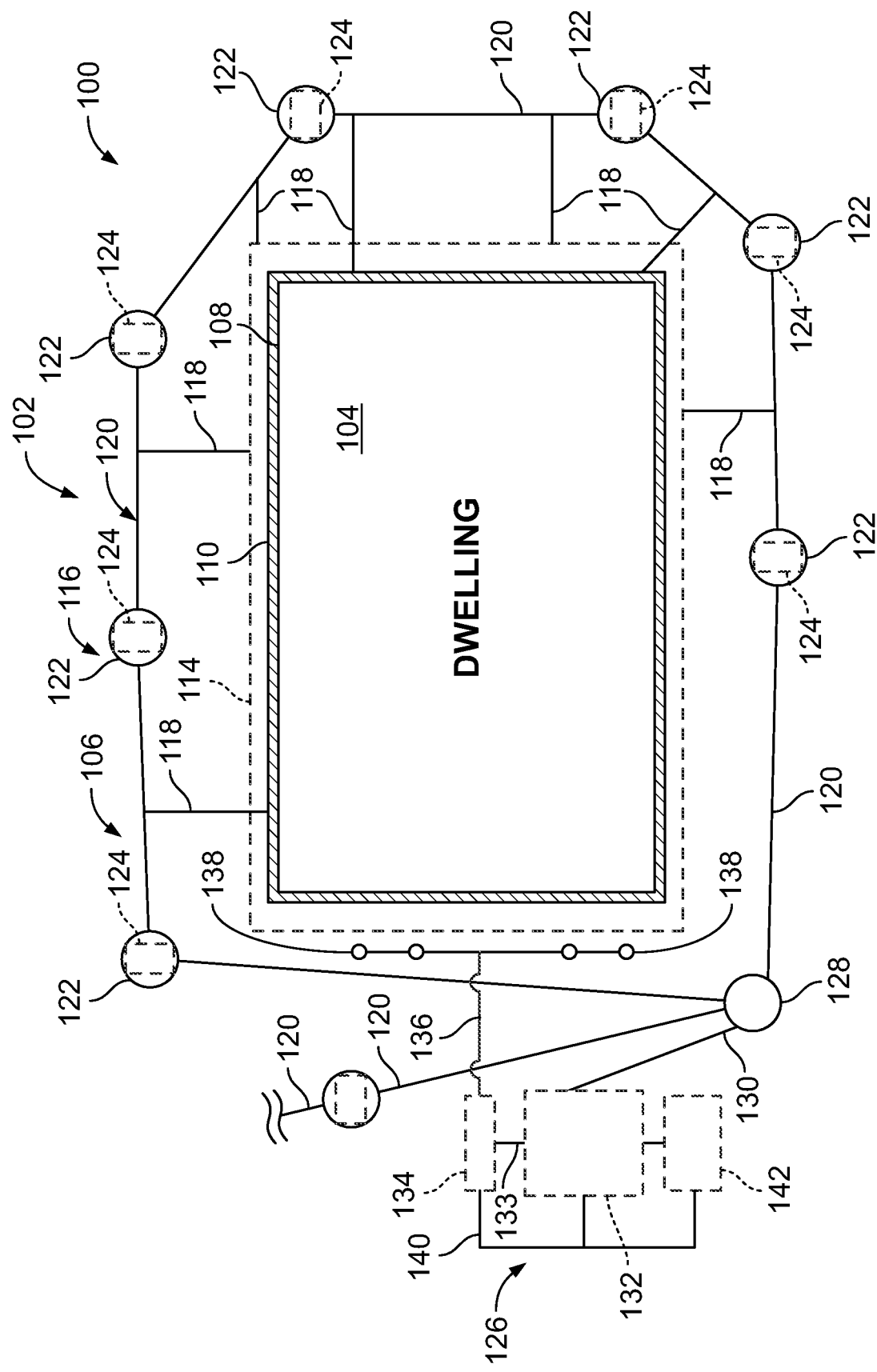
FIG. 1 is a top schematic view of an irrigation recirculation system in a recirculation area in accordance with an example of the invention.

FIG. 1 illustrates a top schematic view of an irrigation recirculation system 100, in accordance with at least an example of the disclosure. In the example of FIG. 1, the irrigation recirculation system 100 is utilized in association with water recirculation area 102. In the example of FIG. 1, the water recirculation area includes a dwelling 104. The dwelling can include but is not limited to a home, garage, shed, barn, apartment, office building, or the like. While in this example a dwelling 104 is presented on the water recirculation area 102, in other examples of implementation, a dwelling 104 is not presented in the area 102. In such examples the area includes but is not limited to a football field, soccer field, outdoor track, baseball field, other sports or hobby related field and open area, stadium, fair ground, concert ground, crop field, farmland, or the like.

In FIG. 1, a water collection system 106 is provided. The water collection system 106 can include gutters 108 on the dwelling that catch the rain or other water from the roof of the dwelling.

The gutters 108 can include a filter element 110 that cover the gutters 108 such that rain and other fluid going into the gutter pass through the filter element 110. The filter element 110 is structured from a material such that the mesh or other structure is permeable to fluid and inhibits or prevents solids from penetrating through the structure formed material. In an example, the material of the filter element 110 is made from spun nylon.

When a rain storm occurs and leaves and other debris are carried with the rain water into the gutters 108, the filter element 100 can help ensure that the leaves and debris remain outside the gutters 108 as the rain water flows into the gutters 108. The leaves and debris are then blown away by wind or swept away by a person cleaning the gutters at a later time. In this manner, the filter element 110 provides an initial filtration of the collected water to be recycled or recirculated through the irrigation recirculation system 100.

In an example, the water collection system 106 can also include tile elements 114, such as positioned about the dwelling 104, such as can help inhibit or prevent the flow of water toward the foundation of the dwelling. One or more other water collection structures such as rain barrels, standing water pumps, sump pumps, or the like are also contemplated by this disclosure. Such structures of the water collection system 106 can be used to direct water toward a drainage system 116.

The drainage system 116 can include a water intake conduit 118 that receives water from the collection system and directs the water into a fluid flow conduit 120 that defines a fluid flow path. The fluid flow conduit 120 conveys the water to a water collection basin 122. In an example of the drainage system, multiple basins 122 are positioned throughout the water recirculation area 102. A filter element 124 is disposed within each collection basin 122 for removing solids from the collected water. An example of a collection basin 122 is described in detail with reference to FIG. 2.

In FIG. 1, in an example, the collection basins 122 are interconnected through a series of the fluid flow conduits 120. The fluid flow conduits 120 can run underground, such as generally parallel to the top surface of the ground. The fluid flow conduits 120 can provide a fluid flow path from the basins 122 to a storage system 126. In this manner, as the water flows along the fluid flow path, the water can be filtered in one or multiple basins 122 prior to being conveyed to the storage system 126. In an example, the collection basins 122 need not be interconnected with fluid flow conduits 120 and instead an individual fluid flow conduit 120 can extend from a collection basin 122 directly to the storage system 126 such as with only a single passage through a single filter element 124.

The storage system 126 can intake all of the filtered water flowing from the basins 122 through the fluid flow conduits 120. An example of a storage system 126 is shown and described in detail with relation to FIG. 4. In FIG. 1, an interceptor tank 128 can receive the filtered water from the fluid flow conduits 120. From the interceptor tank 128, water can be conveyed through a storage conduit 130 to a storage tank 132.

Storage tank 132 can be fluidly connected, such as via a distribution conduit 133, and can provide water into a distribution tank 134. From the distribution tank 134 water is either conveyed through an irrigation conduit 136 to an outlet nozzle 138, or through a waste water conduit 140 to a waste water reservoir 142. In an example, the outlet nozzle 138 is a sprinkler head. In an example, the waste water reservoir 142 is a municipal reservoir that directs water to a municipal sewer or water system.

Figure 2A:
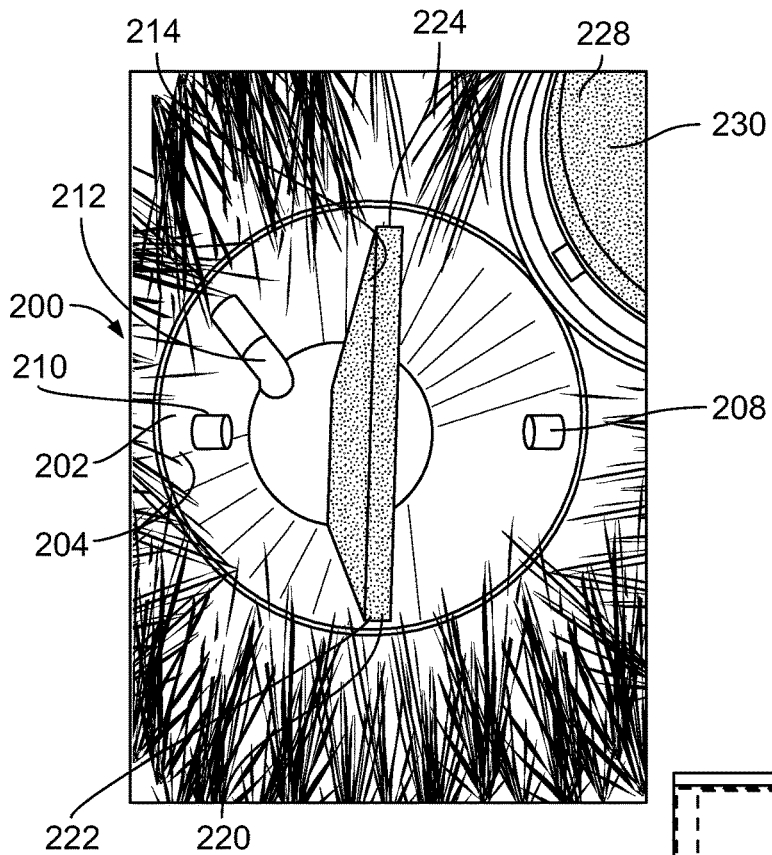
FIG. 2A is a top perspective view of a basin of an irrigation recirculation system in accordance with an example of the invention.
Figure 2B:
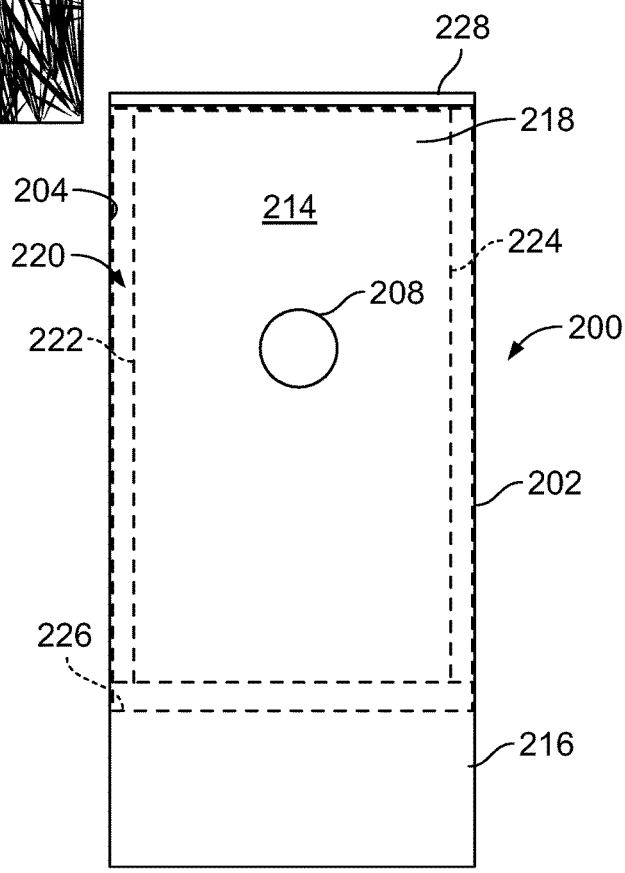
FIG. 2B is a side plan view with hidden lines of a basin of an irrigation recirculation system in accordance with an example of the invention.

FIGS. 2A-2B illustrate an example of a collection basin 122 that can be utilized in the drainage system 116 of the irrigation recirculation system 100 of FIG. 1. The collection basin 200 can include a housing 202 such as disposed vertically in the ground and can provide an interior cavity 204 that holds a volume of water conveyed from a water collection system. The housing 202 in an example can be made from metal or hard plastic to provide an impermeable barrier between the dirt and the water contained in the interior cavity 204 of the housing 202.

The collection basin 200 can include a fluid flow conduit inlet 208 that directs water into the basin and a fluid flow conduit outlet 210 that takes water from the basin 200 disposed through the housing 202. The fluid flow conduits 208 and 210 are examples of the fluid flow conduits 120 described in regard to FIG. 1. The collection basin 200 also optionally includes an overflow conduit outlet 212 for conveying overflow water from the interior cavity 204.

A removable filter element 214 is disposed within the interior cavity 204 of the housing 202. The filter element 214 is generally centrally located within the basin, extending vertically from adjacent a bottom end 216 to a top end 218. The filter element 214 extends in a plane generally perpendicular to the fluid flow path. The filter element 214 also extends such a length and the inlet fluid conduit is angled in such a way that water flowing into the fluid flow conduit inlet 208 strikes a portion of the filter element 214.

In an example, the filter element 214 is made from a material such that the structure of the filter element is penetrable to fluid and inhibits or prevents solids from penetrating through the filter structure. This material is shown in FIG. 2A and at least ½ inch think. In one example the material is between ½ inch and 2 inches in thickness. The material comprises interwoven threads of varying diameters of at least ⅛ inch diameter. In one example the interwoven threads have a diameter in a range between ⅛ inch diameter and ¼ inch diameter. Specifically, the vertical filter structure when struck laterally by a water and solid mixture above a threshold velocity causes both the water and solid to change direction, or bounce off the filter. In this manner, the solid within the water does not become lodged within the filter material. Once the water and solids change directions, the solids through gravity sink to the bottom of the basin 200. Meanwhile, the standing water on top of the solids is then below the threshold velocity and thus permeates through the material. In an example, the material of the filter element 110 is made from spun nylon, such as to form a three dimensional mesh that allows fluid to penetrate but inhibits solids larger than openings in the mesh from penetrating through the filter structure.

A frame 220 is secured to the interior cavity 204 to receive the filter element 214. The frame 220 includes spaced apart brackets 222, 224 secured along the interior cavity 204 that are connected with a crossbar bracket 226 adjacent the bottom end 216 of the basin 200. The brackets 222, 224, and 226 in an example are u-shaped brackets that receive the filter element 214. In an example, when the filter element 214 is inserted into a filter position in the frame 220, the filter element 214 slides within the brackets 222, 224 until engaging the crossbar bracket 226. Once inserted in the filter position, the brackets 222, 224, and 226 prevent downward and lateral movement of the filter element 214 when the filter element 214 is struck by the water and solid mixture.

A removable lid element 228 covers the top end 218 of the basin 200. The lid element 228 includes a lid filter element 230 extending across the interior area of the lid element 228. In an example, the lid filter element 230 is made of spun nylon. By being removable, the lid element 228 provides access to within the basin 200 for changing of the filter element 214 or removal of solids at the bottom end 216 of the basin 200 through vacuuming or other means. In an example, during a 60-day period between 70,000-75,000 gallons of water can be filtered through the filter element 214 resulting in the removal of 3-5 gallons of unclean water as the bottom end 216 of the basin 200.

Figure 3:
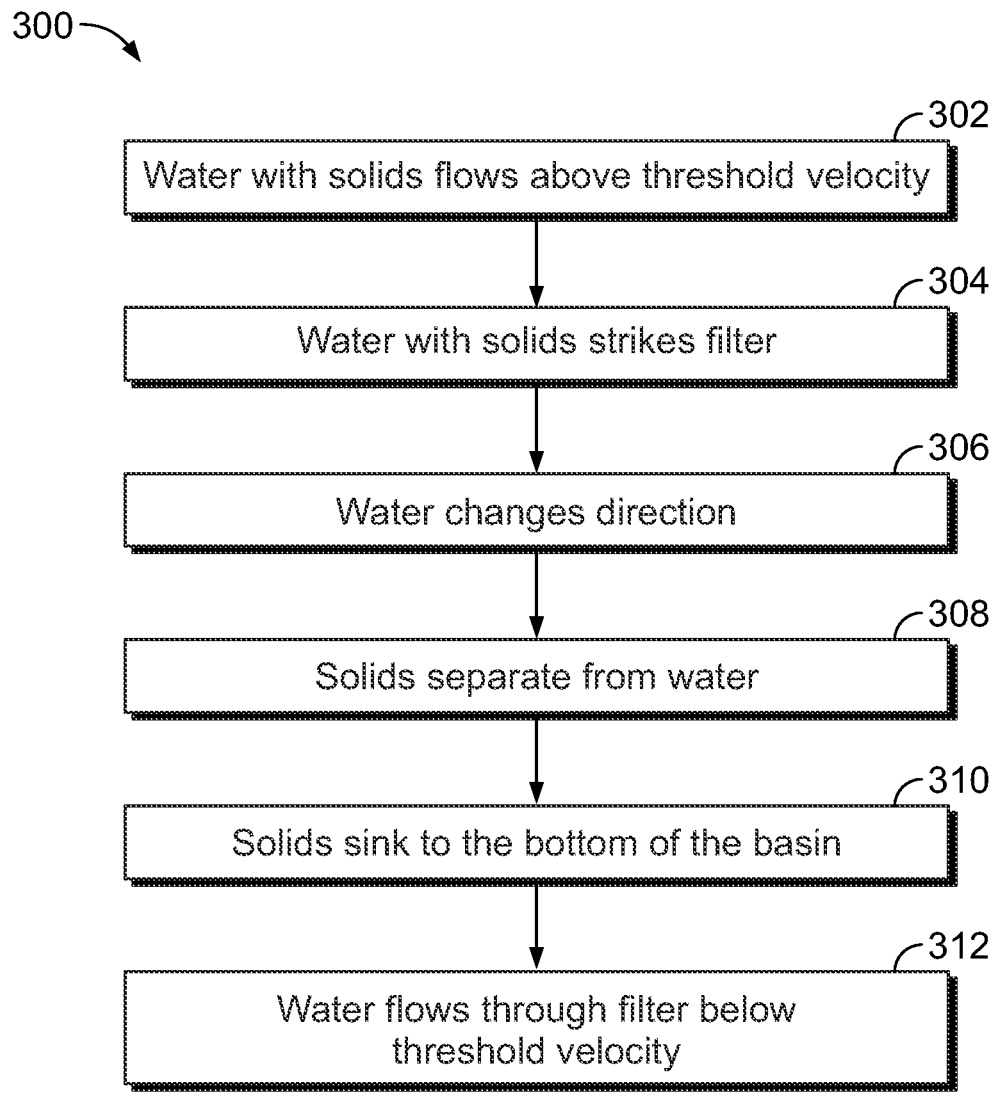
FIG. 3 is a flow chart of a method of filtering water, in accordance with an example of the invention.

FIG. 3 illustrates an example of a method 300 of filtering solids in a basin, such as the basin 200 of FIG. 2. At 302, water flows through a fluid flow conduit inlet at a velocity above a threshold velocity. At 304, the water from the inlet strikes the filter element with the velocity above the threshold velocity. At 306, the water striking the filter element changes direction as a result of the material of the filter element. At 308, solids separate from the water because when the water changes direction, the water moves faster than the solids in the water. At 310, as a result of gravity, the solids sink to the bottom end of the basin. At 312, water that had struck the filter element and is now flowing below the threshold velocity permeates through the filter element and to the fluid flow conduit outlet.

In other words, as a result of turbulent flow cause by the water striking and bouncing off the filter element, solids dislodge from the incoming water and sink to the bottom end of the basin. After initial contact, the water seeks the path of least resistance as a result of water pressure and permeates through the filter element. In this manner, filtered water flows over the top of water contaminated with dirt, debris and other solids to the fluid flow conduit outlet. Therefore, when maintenance occurs, instead of replacing the filter element, one need only open the lid element remove the filter element and remove the dirt, debris and other solids settling at the bottom end of the basin. Such removal can optionally be done with a vacuum or other cleaning device.

Figure 4:
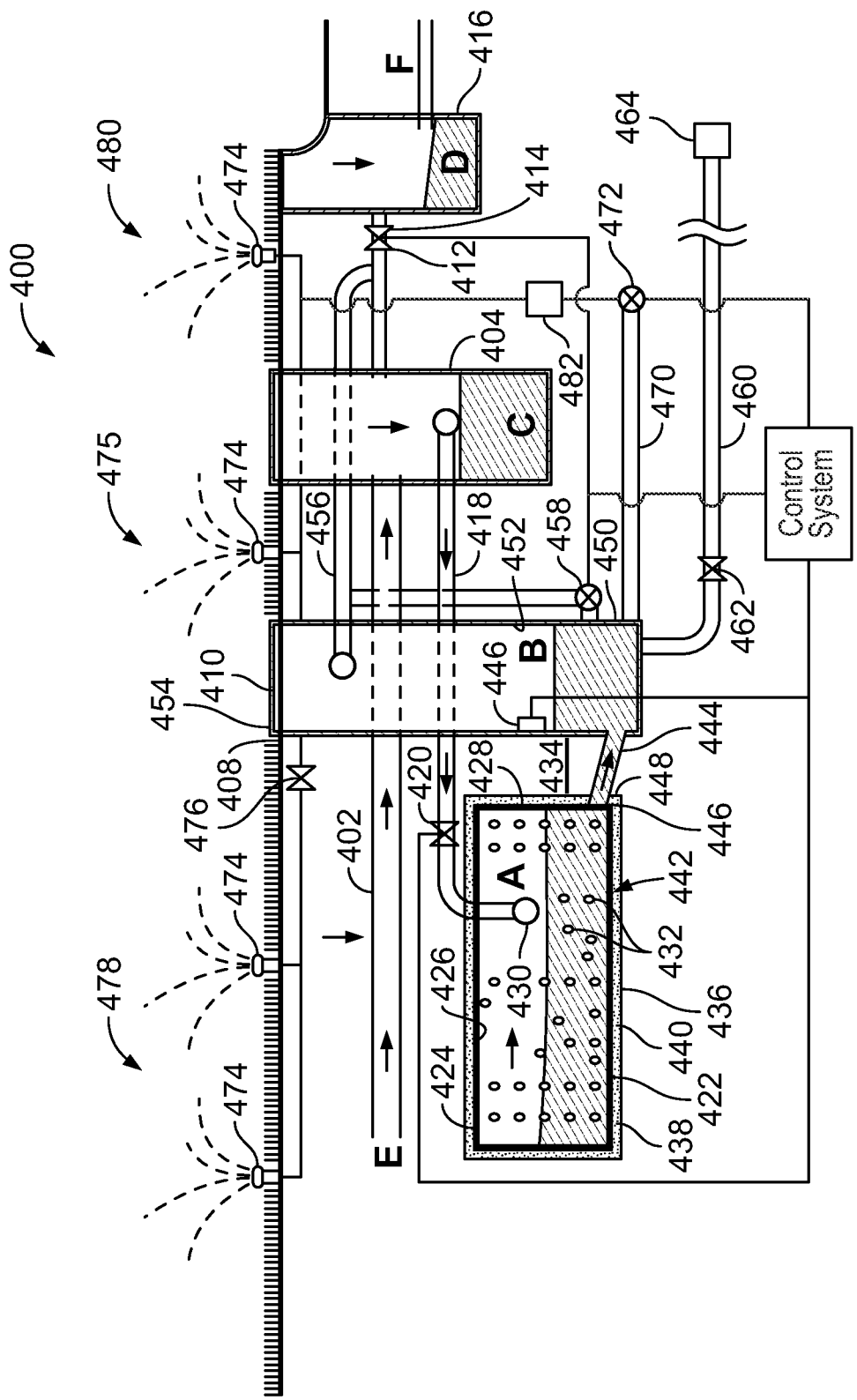
FIG. 4 is a schematic diagram of a storage system of an irrigation recirculation system, in accordance with an example of the invention.

FIG. 4 illustrates a schematic representation of an example of a storage system 400 that can be the storage system 126 of the irrigation recirculation system 100 of FIG. 1. The FIG. 4 representation is not to scale and is presented in such a manner for clarity of explanation. The tanks and conduits discussed can be located about an entire recirculation area as described in the example of FIG. 1.

The storage system 400 includes an inlet fluid flow conduit 402 that directs water received from basins in the recirculation area and conveys the water to an interceptor tank 404. The interceptor tank 404 has an interior cavity 406 that is accessible from above the ground level 408 by a removable lid 410.

The interceptor tank 404 is in fluid communication with a waste water conduit 412 that can include a waste water check valve element 414. Water is conveyed from the interceptor tank 404 though the waste water conduit 412 to a waste water reservoir 416 when the waste water check valve element 414 is actuated. In an example, the waste water reservoir 416 is a municipality water or sewer system.

The interceptor tank 404 additionally is in fluid communication with a storage tank conduit 418 that has a valve element 420 that controls the conveyance of water to a storage tank 422. The valve element 420 when actuated either allows or prevents the flow of water from the interceptor tank 404 to the storage tank 422.

In operation, the interceptor tank 404 serves as a holding tank for filtered water received from the basins. This allows testing of the water in the interceptor tank 404 for contaminants prior to conveyance to the storage tank 422. In particular, the interceptor tank 404 can be accessed through the removable lid 410 and tested for contaminants such as e-coli, lead, mercury, or the like. If levels are considered unsafe, the water can then be conveyed to the waste water reservoir 416, or disinfected in the interceptor tank 404. After disinfection, the water can be tested again, for example, until the water is shown to be safe.

During testing, when the water in the interceptor tank 404 is tested as safe, the valve element 420 in the storage tank conduit 418 is actuated to allow water to be conveyed to the storage tank 422. In this manner, during testing for contaminants and disinfection, water within the storage tank 422 can still be used for irrigation by the irrigation system.

The storage tank 422 receives water from the storage tank conduit 418 and includes a generally rectangular frame 424 having open side walls that surround and open interior cavity 426. The rectangular frame 424 and interior cavity 426 can be surrounded and enclosed by a membrane 428. In an example, the membrane comprises a range of between 3500-4000 square feet (sq. ft.) of material.

The membrane 428 can include an opening 430 such as for receiving the storage tank conduit 418 and can include perforations 432 disposed therethrough. As a result of the material of the membrane and the size and shape of the perforations 432, when the ground 434 surrounding the storage tank 422 is saturated with ground water, the ground water is able to permeate through the perforations 432 and into the storage tank 422 while solids such as dirt particles are prevented from entering the interior cavity 426 of the storage tank 422. Specifically, during the excavation process for installing the storage tank, natural tunneling is provided to convey water saturated in the ground 434 to the storage tank 422. In an example, the ground or soil adjacent the storage tank is at or over 94% saturated with water when water is conveyed through the perforations 432. Thus, between the collection system and the storage tank 422 approximately 400-2000 gallons of water are harvested by the irrigation recirculation system.

In an example, as shown in FIG. 4, a secondary membrane 436 can also include perforations 438 and can surround and enclose the membrane 428 that encloses the frame 424. In this example, a pocket 440 is formed between the membrane 428 and secondary membrane and filled with abrasive material 442. In one embodiment, the abrasive material 442 is a combination of rock and sand. The abrasive material 442 acts to filter solids and debris that make it through the perforations 438 of the secondary membrane 436. The abrasive material 442 prevents such solids from entering the interior cavity 426 of the storage tank 422.

The storage tank 422 also includes a discharge tank conduit 444 positioned adjacent the bottom of the storage tank 422 and disposed through openings 446 and 448 of the membrane 428 and secondary membrane 436. The discharge tank conduit 444 conveys water from the storage tank 422 to the distribution tank 450. In all, the irrigation recirculation system can have an overall flow rate through the system of between 600-650 gallons per minute.

The distribution tank 450 has an interior cavity 452 that receives water from the storage tank 422 via the discharge tank conduit 444. The distribution tank 450, similar to the interceptor tank 404 extends above ground level 408 and has a lid element 454 that is removable to allow access to the interior cavity 452 of the distribution tank 450. In this manner, one can test the water within the distribution tank 450 for contaminants such as e-coli, lead, and mercury prior to use to determine if disinfection or discharge of water needed.

The distribution tank 450 is in fluid communication with a waste water conduit 456 for directing water from the distribution tank 450 to the waste reservoir 416. The waste water conduit 456 of the distribution tank 450 has a waste water pump 458 for pumping water from within the interior cavity 452 of the distribution tank to through the waste water conduit 456.

The waste water pump 458 of the distribution tank 450 is considered a low pressure, high volume pump. In particular, the waste water pump pumps the water with a pressure is a range from 40-70 pounds per square inch (psi). This is approximately in a range of 40-50 gallons per minute. Thus, if water from within the interior cavity 452 needs to be discharged into the waste water reservoir 416, the waste water pump actuates to direct the water to the waste water reservoir accordingly.

The distribution tank 450 also receives and is in fluid communication with a supplemental water conduit 460. The supplemental water conduit 460 has a valve element 462 therein and receives water from a supplemental water source 464. In an example, the supplemental water source is pre-filtered water from a municipal water supply.

The supplemental water of the supplemental water source 464 is provided to ensure if a condition within the storage system 400 occurs where the amount of recycled water is insufficient for the needs of the irrigation system for any reason, filtered water is still available. Such reasons can include but are not limited to drought, system malfunction, extended testing and disinfection periods, or the like, filtered water is still available for the irrigation system.

A distribution tank sensor 466 within the distribution tank 450 determines the water level within the distribution tank 450. The sensor 466 provides signals to a control system 468 that contains circuitry and is electrically connected to the valve element 462 to automatically actuate the valve element 462 of the supplemental water conduit 460 to supply the filtered water when water levels are determined to be insufficient. Additionally or alternatively, this supplemental filtered water can be added to the distribution tank 450 to dilute contaminated water to a point where the concentration of contaminants within the discharged water meets requirements of a municipality.

The distribution tank 450 is in fluid communication with a sprinkler head conduit 470 that includes a sprinkler head pump 472 for pumping the water through the sprinkler head conduit 470 to discharge nozzles 474 of an irrigation system 475. In an example, the sprinkler head pump is a turbine pump capable of providing high pressure through the discharge nozzles 474. In an example, the discharge nozzles 474 are sprinkler heads. The pump 472 can include a high-pressure pump that operates at in a range from 100 pounds per square inch (psi) to 225 psi. Thus, fluid flows through the sprinkler head conduit 470 at a speed in a range of 85-210 gallons per minute.

A distribution valve element 476 is disposed within the sprinkler head conduit 470 that when actuated determines whether water is distributed to a first zone 478 of discharge nozzles 474, a second zone 480 of discharge nozzles 474, or another zone. In an example the distribution valve element 476 is a valve manifold that provides water to the different zones as desired. Additionally or alternatively, water can be distributed to multiple zones simultaneously.

A microfilter 482 is also disposed within the sprinkler head conduit 470 for a final filtration of water prior to discharge through the discharge nozzles 474. The microfilter 482 is able to last with only periodic maintenance as a result of the filtering and cleaning of water throughout the irrigation recirculation system.

The storage system 400 thus provides water collection, filtration, and self-cleaning capabilities. In an example the storage system 400 stores between 5,000 and 742,000 gallons of water for distribution and filtration.

Figure 5:
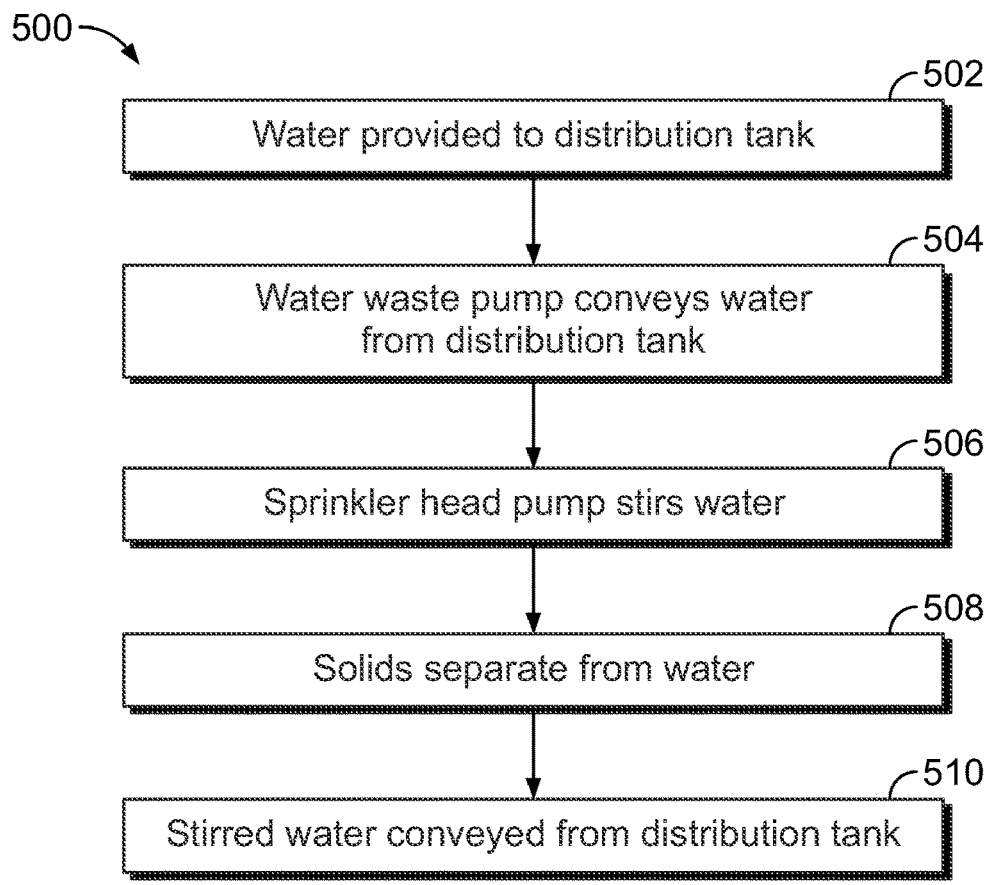
FIG. 5 is a flow chart of a method of cleaning a distribution tank, in accordance with an example of the invention.

FIG. 5 illustrates a method of cleaning a distribution tank 500. At 502, water is provided to a distribution tank. At 504, a waste water pump conveys the water from the distribution tank. At 506, a sprinkler head pump stirs the water in the distribution tank by conveying water to a sprinkler head conduit. At 508, the waste water pump conveys the stirred water from the distribution tank to the waste water reservoir. In this manner, the distribution tank is self-cleaned within the irrigation system.

Figure 6:
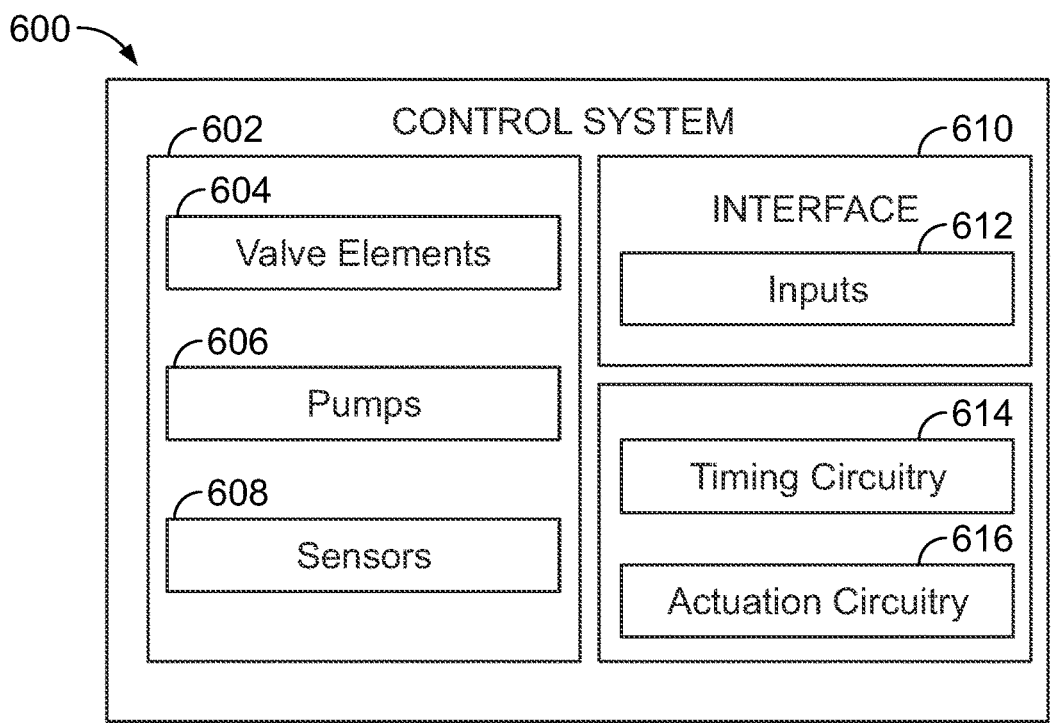
FIG. 6 is a control system of an irrigation recirculation system, in accordance with an example of the invention.

FIG. 6 illustrates an example of a control system 600 that can be utilized for operating the irrigation recirculation system of FIG. 1 and is an example of the control system 468 described in relation to FIG. 4. The control system 600 is in communication with electrical components 602 of the irrigation recirculation system. These components 602 include system valve elements 604, including at least valve elements of the storage tank conduit, distribution tank conduit, waste water conduit, and sprinkler head conduit. The components 602 also include pumps 606, including at least the sprinkler head pump and the waste water pump. The components 602 additional include system sensors 608, including at least the distribution tank sensor.

The control system 600 also includes a user interface 610 that includes inputs 612 for controlling the electrical components 602 of the irrigation system such as the valve elements and pumps. These inputs 612 allow both manual control of such electrical components 602 and programing such that the control system 600 automatically actuates the electrical components 602. To this end, the control system 600 includes timing circuitry 614 for opening and closing valve elements 604 such as the distribution valve, and pumps 606. In this manner, the timing circuitry 614 determines when water is distributed to different zones of the outlet nozzles and when the pumps 606 actuate for cleaning of the distribution tank.

The control system 600 also includes water level actuation circuitry 616. The water level actuation circuitry 616 receives signals from at least one sensor in the distribution tank indicating the height of the water in the distribution tank. Based on the signals the water level actuation circuitry receives, the circuitry actuates a supplemental water valve element to convey water from a supplemental water source into the distribution tank until a desired water level is detected.

Method examples of the control system described herein may be machine or computer-implemented at least in part. Some examples may include a computer-readable medium or machine-readable medium encoded with instructions operable to configure an electronic device to perform methods such as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), memory cards or sticks, random access memories (RAMs), read only memories (ROMs), or the like.

Figure 7:
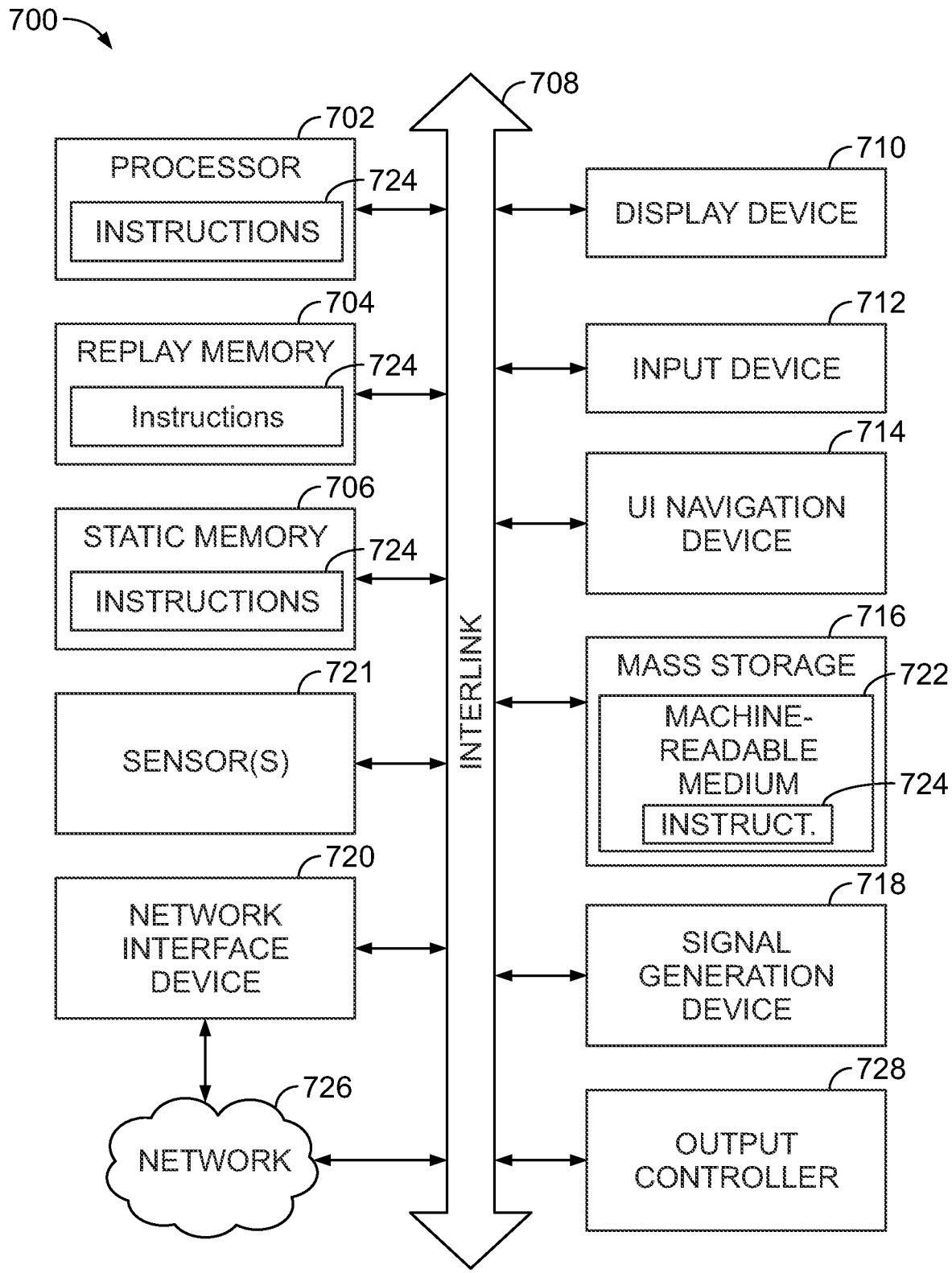
FIG. 7 is a schematic diagram of a control system of an irrigation recirculation system in accordance with an example of the invention.

FIG. 7 illustrates a schematic showing system 700 that is an example of the control system 600 of the irrigation recirculation system 100 of FIG. 1. The system 700 can include local device 701, user interface 702 (where interface 610 is an example of such an interface), display 704, interlink 706, central device 708, central device database 710, and expert device 712. Local device 701 can include processor 714, volatile memory 716, static memory 718, and network device 720.

Local device 701 can be any computing device, such as a handheld computer, for example, a smart phone, a tablet, a laptop, a desktop computer, or any other computing device including information processing and storage capabilities and communication capabilities. Local device 701 can include processor 714, volatile memory 716, and static memory, which can be connected by wire or other electrical conduit within local device 701 and can be configured to receive information, process information, output information, and store information. The information can be temporarily stored on volatile memory 716 and can be relatively permanently stored on static memory 718. In some examples, configurations of these components within local device 701 can be considered machine readable medium.

The terms "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

User interface 702 can be any input and/or output device. For example, user interface can be a monitor, keyboard, and mouse in an example. In other examples, user interface 702 can be a touch screen display. Display 704 can be a display for displaying output from local device 701 and in some examples can receive input and transfer input to local device 701 (for example a touch screen display).

Central device 708 can be a remote device similar in configuration to local device 701, but located remotely from local device 701. Central device 708 can be configured to connect to multiple of local devices 701, in some examples, through interlink 706. Similarly, expert device 712 can be a remote device similar in configuration to local device 701, but can be operated by a user considered to be an expert. In operation of some examples, the expert user can interface with the processes and decisions of the methods discussed herein.

In some examples, user interface and display 704 can be connected to local device 701 through wired connections, in some examples (such as USB, for example), and through wireless connections (such as Bluetooth, for example) in other examples. In some other examples, interlink 706 can be a local area network (LAN), wide area network (WAN), and interne protocol (TCP/IP) connections. Local device 701 can be similarly connected to interlink 706 (either through a wired or wireless connection). In some examples, network device 720 can connect local device 701 to interlink 706. Central device 708, central device database 710, and expert device 712 can be connected to interlink 706 in a similar manner.

In operation of some examples, system 700 can be configured to perform steps of the methods discussed herein and in some examples may perform steps based on a program stored in volatile memory 716 or static memory 718, where results of the analysis are stored in either volatile memory 716 and/or static memory 718 can be displayed on display 704 and/or transmitted to user interface 702, central device 708, central device database 710, and/or expert device 712. For example, system 700 can develop a model of a shoulder by receiving an image of a patient shoulder. One of local device 701, central device 708, and expert device 712 can segment the image to develop a 3D shoulder model.

Similarly, system 700 can be configured to perform steps of each method discussed herein.

Figure 8:
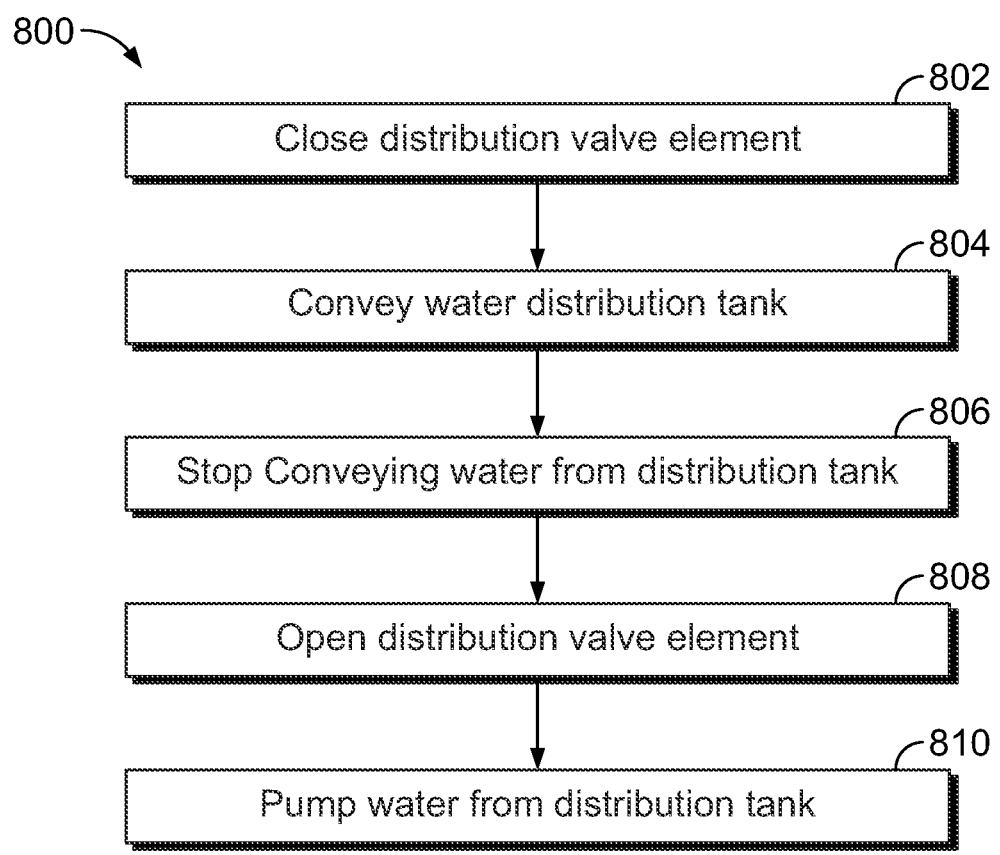
FIG. 8 is a flow chart of a method of cleaning sprinkler heads of an irrigation recirculation system in accordance with an example of the invention.

FIG. 8 illustrates an example of a method of cleaning a sprinkler head 800. At 802, a distribution valve element is closed to prevent water from a first zone of sprinkler heads from being conveyed to a second zone of sprinkler heads. At 804, water is conveyed from a distribution tank by a sprinkler head pump to the first zone of sprinkler heads. At 806, the sprinkler head pump stops conveying water from the distribution tank to the first or second zones of sprinkler heads.

At 808, a distribution valve element is opened simultaneously with the water not being pumped from the distribution tank such that water from the first zone is conveyed to from the first zone to the second zone. This conveyance also causes the formation of air pockets within both the first and second zones. At 810, after water is conveyed from the first zone to the second zone, the sprinkler head pump actuates to start pumping water from the distribution tank to both the first and second zones. This forces the air pockets out of the sprinkler heads in both the first and second zones dislodging any debris in those sprinkler heads. In an example, the ratio of air to water forced out of the sprinkler heads in a given period of time is approximately 50% air and 50% water. In an example, the period of time is in a range between 30-40 seconds. In this manner, methodology for self-cleaning the sprinkler heads of the irrigation system is provided.

Various Notes & Examples

Example 1 is an irrigation recirculation system with a water collection system; a fluid conduit receiving water from the water collection system such that the water flows through the fluid conduit along a fluid flow path; at least one filter element positioned within the fluid flow path such that when the water engages the filter element, the water changes direction and solids in the water are separated from the water; a water distribution tank that receives the water after the water engages the filter element; and a sprinkler head pump for directing the water toward at least one discharge nozzle.

In Example 2, the subject matter of Example 1 optionally includes a basin including the at least one filter element and receiving water from the fluid conduit.

In Example 3, the subject matter of Example 2 optionally includes wherein the at least one filter is replaceably positioned within a frame within the basin.

In Example 4, the subject matter of any one or more of Examples 1-3 optionally include wherein the at least one filter comprises a material that prevents the flow of water through the material above a threshold velocity and allows the flow of water through the material below the threshold velocity.

In Example 5, the subject matter of Example 4 optionally includes wherein the material is spun nylon.

In Example 6, the subject matter of any one or more of Examples 1-5 optionally include wherein the sprinkler head pump is a turbine pump.

In Example 7, the subject matter of any one or more of Examples 1-6 optionally include wherein the water distribution tank includes a waste water pump that directs water adjacent a bottom of the water distribution tank to waste water reservoir.

In Example 8, the subject matter of any one or more of Examples 1-7 optionally include wherein a storage tank receives the fluid and directs the fluid to the water distribution tank.

In Example 9, the subject matter of Example 8 optionally includes wherein the storage tank comprises a perforated membrane disposed about a frame that allows the passage of fluid therethrough and prevents the passage of solids.

In Example 10, the subject matter of Example 9 optionally includes a secondary perforated membrane surrounding and separated from the membrane of the storage tank that allows the passage of fluid therethrough and prevents the passage of solids.

In Example 11, the subject matter of Example 10 optionally includes wherein filter material is disposed between the membrane of the storage tank and the secondary membrane.

In Example 12, the subject matter of any one or more of Examples 1-11 optionally include an interceptor tank that receives fluid from the fluid conduit and directs the fluid to the storage tank.

Example 13 is a method of filtering recirculated water for an irrigation system that includes collecting water from an above the ground source; separating solids from the water by changing the direction of the water with a filter; after separating the solids from the water, conveying the water to a discharge nozzle of an irrigation system.

In Example 14, the subject matter of Example 13 optionally includes after separating the solids from the water, conveying the water to an underground storage tank; conveying ground water adjacent the underground storage tank through a perforated membrane of the underground storage tank and into the underground storage tank; preventing solids from entering the underground storage tank with the perforated membrane.

In Example 15, the subject matter of any one or more of Examples 13-14 optionally include after separating the solids from the water, conveying the water to a distribution tank; pumping water within the distribution tank with a waste water pump to a waste water reservoir; while pumping water within the distribution tank with the waste water pump, stirring the water in the distribution tank by pumping water within the distribution tank with a sprinkler head pump to convey the water to the discharge nozzle.

In Example 16, the subject matter of Example 15 optionally includes wherein the sprinkler head pump creates greater water pressure than the waste water pump.

In Example 17, the subject matter of any one or more of Examples 13-16 optionally include after separating the solids from the water; conveying water through a microfilter prior to conveyance to the discharge nozzle.

Example 18 is a method of clearing debris from a discharge nozzle of an irrigation recirculation system including providing an irrigation recirculation system with a first zone of discharge nozzles and a second zone of discharge nozzles; conveying water from a distribution tank of the irrigation recirculation system to the first and second zones with a sprinkler head pump; providing a distribution valve element between the first zone and second zone; pumping water from the distribution tank to the first zone with the sprinkler head pump; stopping the sprinkler head pump to prevent the conveyance of water from the distribution tank to the first zone; opening the distribution valve element to convey water from the first zone to the second zone; forming pockets of air within the first and second zones when water is conveyed from the first zone to the second zone; after forming the pockets of air, pumping water from the distribution tank to the first and second zones with the sprinkler head pump to convey air and water through the discharge nozzles of the first and second zones.

In Example 19, the subject matter of Example 18 optionally includes wherein the sprinkler head pump is a turbine pump.

In Example 20, the subject matter of any one or more of Examples 18-19 optionally include wherein timing of the pumping of the sprinkler head pump and the opening of the distribution valve element are provided by a control system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method of filtering recirculated water for an irrigation system comprising:
   collecting water from an above the ground source;
   separating solids from the water by changing a direction of a flow of the water with a filter;
   after separating the solids from the water, conveying the water to a discharge nozzle of an irrigation system;
   after separating the solids from the water, conveying the water to an underground storage tank;
   conveying ground water adjacent the underground storage tank through a perforated membrane of the underground storage tank and into the underground storage tank;
   inhibiting or preventing additional solids from entering the underground storage tank via the adjacent ground water with the perforated membrane.

2. The method of claim 1, further comprising:
   after separating the solids from the water, conveying the water to a distribution tank;
   pumping water within the distribution tank with a waste water pump to a waste water reservoir;
   while pumping water within the distribution tank with the waste water pump, moving the water in the distribution tank by pumping water within the distribution tank with a sprinkler head pump to convey the water to the discharge nozzle.

3. The method of claim 2 wherein the sprinkler head pump creates greater water pressure than the waste water pump.

4. The method of claim 1, further comprising:
   after separating the solids from the water; conveying water through a microfilter prior to conveyance to the discharge nozzle.

5. The method of claim 1 wherein changing the direction of the water with a filter comprises:
   conveying water within a fluid flow conduit above a threshold velocity along a fluid flow path; and
   striking a vertical filter element positioned perpendicular to the fluid flow path within a basin.

* * * * *